(12) United States Patent
Perkes

(10) Patent No.: US 6,373,503 B1
(45) Date of Patent: *Apr. 16, 2002

(54) MULTIMEDIA COMPUTER AND TELEVISION APPARATUS

(75) Inventor: Ronald M. Perkes, San Rafael, CA (US)

(73) Assignee: Lumenati, Inc., San Rafael, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/125,803

(22) PCT Filed: Feb. 21, 1997

(86) PCT No.: PCT/US97/04111

§ 371 Date: Aug. 21, 1998

§ 102(e) Date: Aug. 21, 1998

(87) PCT Pub. No.: WO97/31476

PCT Pub. Date: Aug. 28, 1997

Related U.S. Application Data

(60) Provisional application No. 60/012,066, filed on Feb. 22, 1996.

(51) Int. Cl.⁷ .............................................. H04N 5/445
(52) U.S. Cl. ...................................... 345/718; 348/522
(58) Field of Search ................................ 345/327, 329, 345/333, 342, 718; 348/552; 455/6.3; 709/202, 203, 229

(56) References Cited

U.S. PATENT DOCUMENTS

| | | | | |
|---|---|---|---|---|
| 5,396,546 A | * | 3/1995 | Remillard | 379/96 |
| 5,481,296 A | * | 1/1996 | Cragun et al. | 348/13 |
| 5,610,663 A | * | 3/1997 | Nan et al. | 348/554 |
| 5,722,041 A | * | 2/1998 | Freadman | 348/552 |
| 5,819,156 A | * | 10/1998 | Belmont | 455/2 |
| 5,900,867 A | * | 5/1999 | Schindler et al. | 345/327 |
| 5,905,497 A | * | 5/1999 | Vaughan et al. | 345/352 |
| 5,926,175 A | * | 7/1999 | Sturgeon et al. | 345/327 |
| 5,929,849 A | * | 7/1999 | Kikinis | 345/327 |
| 5,958,016 A | * | 9/1999 | Chang et al. | 709/229 |
| 5,990,884 A | * | 11/1999 | Douma et al. | 345/327 |
| 6,046,721 A | * | 4/2000 | Song et al. | 345/132 |
| 6,047,121 A | * | 4/2000 | Vaughan | 395/674 |
| 6,119,172 A | * | 9/2000 | Belmont et al. | 709/250 |
| 6,209,044 B1 | * | 3/2001 | Vaughtan | 710/14 |

* cited by examiner

*Primary Examiner*—Amare Mengistu
(74) *Attorney, Agent, or Firm*—Foley & Lardner

(57) ABSTRACT

A multimedia computer and television apparatus (10) includes a dual mode monitor portion (20) adapted to display either or both a TV broadcast signal or computer (data) signal, connected to a computer portion (30) configured for both Internet access and television broadcast reception, and a remote control portion (40) adapted to control the computer portion (30) and monitor portion (20).

6 Claims, 4 Drawing Sheets

MULTIMEDIA COMPUTER AND TELEVISION APPARATUS

This appln. claims benefit of Prov. No. 60/012,066 filed Feb. 2, 1996.

TECHNICAL FIELD

This invention relates generally to electronic devices, and more specifically to an improved combination multimedia computer and television apparatus.

BACKGROUND ART

The traditional home personal computer (PC) looks, feels, and functions much like the standard office personal computer. In contrast, the traditional home television is not suitable for computer usage. The inventive apparatus provides a new and unique product that is a combination large screen television and multimedia computer with a number of unique identifying characteristics.

DISCLOSURE OF INVENTION

The multimedia computer and television apparatus of this invention includes a dual mode monitor portion adapted to display either or both a TV broadcast signal or computer (data) signal, connected to a computer portion configured for both Internet access and television broadcast reception, and a remote control portion adapted to control the computer portion and monitor portion.

The inventive apparatus can thus handle many tasks: home based entrepreneurs can run complex spreadsheets, sports fans can preview up to twelve or more broadcast games at once on a high resolution screen, audiophiles can listen to clean theater quality sound, netsurfers can cruise down the information highway with speed and style, gamesters can play action, strategy and thought provoking games, and the operator can choose to do all this and more at the same time from the comfort of a couch with the inventive wireless keyboard command center. In short, the apparatus melds entertainment, education, information access, and increased productivity into a sleek elegant package that people will be proud to display and use in their living room.

The apparatus allows the user to custom tailor their learning and entertainment environment, and uses proven, responsive technology to empower the user. The apparatus defies placement in existing product categories by combining the best features of digital technology for consumers.

BEST MODE FOR CARRYING OUT THE INVENTION

Figure 1:
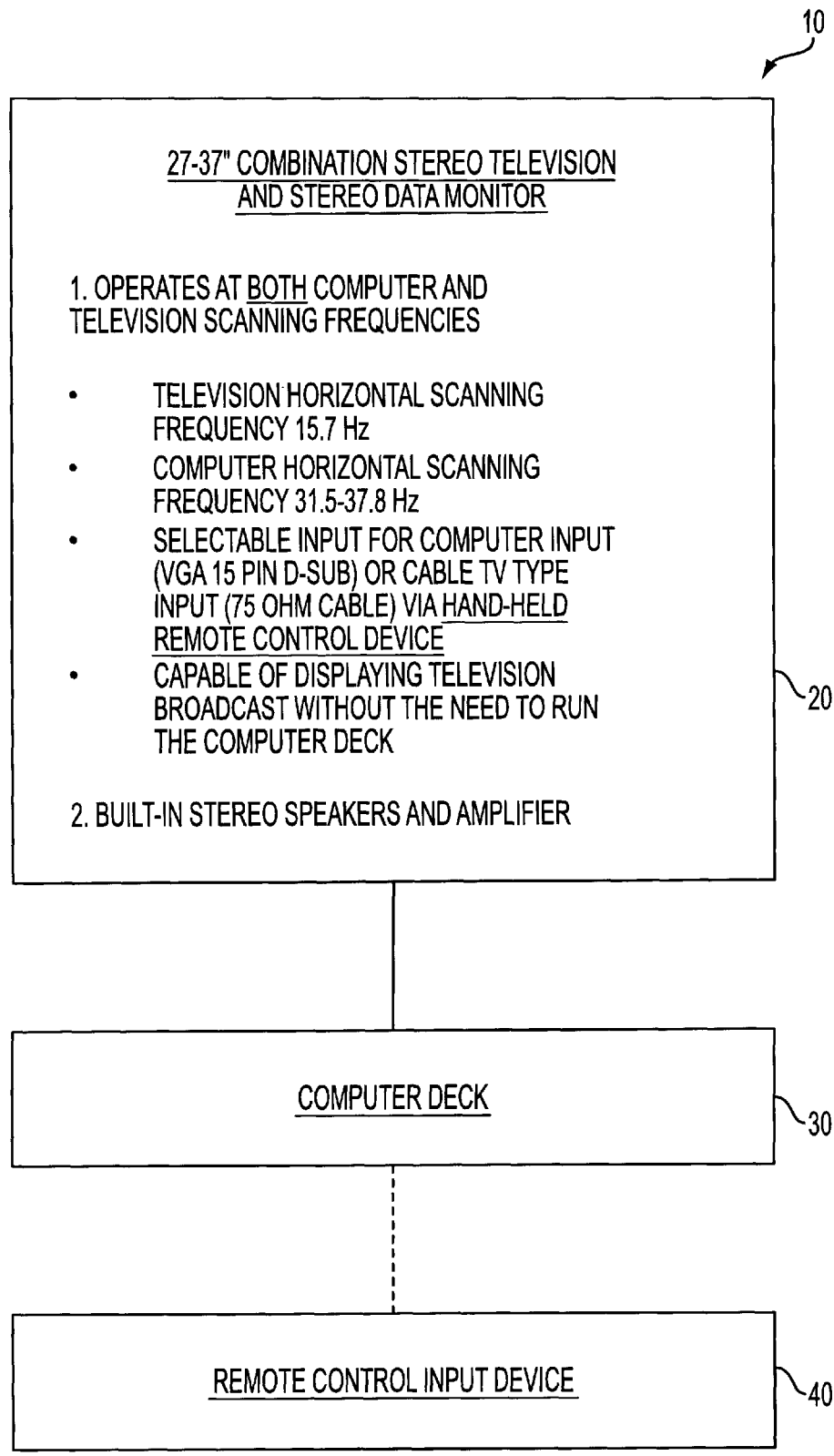
FIG. 1 is a schematic block diagram of the components of the inventive multimedia computer and television apparatus of this invention.

FIG. 1 is a schematic block diagram of the components of the inventive multimedia computer and television apparatus 10 of this invention, including combination stereo television and stereo data monitor 20, computer deck 30, and remote control input device 40.

The apparatus includes a high powered computer with a 75 mhz or faster Pentium processor, a 750 megabyte or larger hard drive, 8 megabytes or more of RAM, 64 bit or more graphics accelerator, 3.5" floppy disk drive and a 28.8 bps or faster modem in a sleek low profile black case. Multimedia capabilities include a quad speed or faster CD-ROM player, 125+ channel TV tuner, video picture capture, 16 bit or more stereo sound output, and a separate game controller. The CPU also allows for expansion: RAM is expandable to 128 megabytes or more, the modem is cable modem upgradeable, and 2 or more expansion slots are provided for customer flexibility.

The monitor is a 29" or larger stereo monitor that allows for both computer input and audio/video input. The dual inputs allow the monitor to function as a normal television when the user does not want to turn on the CPU. The monitor has RCA stereo output jacks to connect to a stereo sound system to complete a home theater system.

The unique remote command keyboard controls the whole system. In matching black, the 105 key keyboard may be powered by two AAA batteries with a working range of 40 or more feet to allow maximum user comfort and flexibility. The mouse controller may be a built-in touchpad that allows the user to be truly freed of cumbersome cords and plugs.

Components and features of the inventive apparatus may include the following or their equivalents:

CPU: Intel Pentium 75 mhz processor; 8 MB of System RAM expandable to 128 MB; 256 K Pipeline Burst mode cache; 630 MB Mode 4 hard drive with 12 ms average access; 1.44 MB 3.5" floppy; Quad Speed 300 ms access CD-ROM drive; 4 bit graphics accelerator with 1 MB video memory; 2 Hi-speed 16550 buffered serial communications ports; 1 ECP/EEP hi-speed parallel port; Game/midi port; Energy saving sleep mode; 110/220 switchable power supply; FCC Class B approved; and UL/CSA approved.

Multimedia Capability: 125 channel TV tuner built into PC; Supports TV in a Window or full screen TV; Watch TV while you access the Internet, access your favorite application, or play your favorite game; On-screen remote control for channel selection, mute, On/Off, volume control; On-screen single frame video capture allows you to capture and use video images by saving them as BMP, TIFF, PCX, TGA; Simultaneously previews 12 channels at once; 16 Bit Adlib/Sound Blaster compatible sound; Stereo audio output; Accepts input from Cable TV, VCR, camcorder; 28,800 Baud internal FAX/Modem upgradeable to Cable modems; Separate game controller.

Big Screen PC+TV Monitor (e.g., 29–37 inch): Functions as a stand-alone stereo high resolution digital television or as a stereo multimedia computer monitor; Supports the following resolutions: Standard NTSC television (15.8 Khz); 640× 480 VGA (31.5 Khz); 800×600 Super VGA (38 khz); 1024×768 Super VGA (38 khz); 125 channel tuner; Stereo sound; Remote control for On/Off, volume, brightness, color, HUE, contrast, channel; Remotely selectable computer input or A/V inputs (VCR, Cable box); Stereo RCA outputs to allow connections to your home theater sound system; and Parental channel lock out.

Infrared Keyboard: 105 key full sized keyboard; Infrared sensor designed to allow up to 40 foot range of remote operation; Mouse touchpad built into the keyboard; Powered by 2 AAA batteries for long use.

Software: Microsoft Windows 95; Entertainment Plus Pack; 55 action packed and fun-filled games; Mavis Beacon teaches typing; World Atlas; Groliers Encyclopedia; America Online software; Netcom Netcruiser Internet software; 10 hours of free on-line trial service through Netcom Communications and America OnLine; and SurfWatch software to keep the Internet safe for your children.

The combination television/data monitor has been engineered to provide a unique feature set consisting of all of the following capabilities bundled together:

1. Computer levels of display resolution at 640×480, 800×600, and 1024×768.
2. Television display capabilities as a stand-alone device without the need for the computer deck to be turned on.
3. Selectable input for computer input (VGA 15 pin D-sub) or cable TV type input (75 Ohm cable) via hand-held remote control device;
   television horizontal scanning frequency 15.7 Hz;
   computer horizontal scanning frequency 31.5–37.8 Hz.
4. Built-in stereo speakers and amplifier.

This unique display with its proprietary feature set is capable of sensing what type of signal is present, be it either a TV (NTSC/PAL) or data (VGA/SVGA) signal, then to adjust accordingly to the correct scanning frequency. A further significant feature is the monitor's unique capability to function as a stand-alone television monitor. This is accomplished by adding additional display circuitry allowing for the added display modes.

The computer deck has been specially designed to fit into a home entertainment console. Its unique identifying features include:

1. Its black or charcoal gray color, similar to the color of other consumer electronics home entertainment devices.
2. Its low-profile design height of less than the industry standard 6' height, enabling it to fit into the confines of most home entertainment cabinets.
3. Its ability to run Microsoft DOS and Microsoft Windows.
4. Its ability to receive and output to the combination television/data monitor television broadcasts.

The input device has been specially designed for the system. Its unique identifying feature set includes the combination of the following design elements:

1. Remote control alphanumeric keyboard that utilizes IR (infrared) data transmission between the keyboard's IR transmitter and the computer deck's IR receiver, allowing the keyboard to be operated remotely from the computer deck.
2. Remote control pointing device (mouse, touchpad, or trackball) that utilizes IR (infrared) data transmission between the pointing device's IR transmitter and the computer deck's IR receiver allowing the pointing device to be operated remotely from the computer deck.

Figure 2:
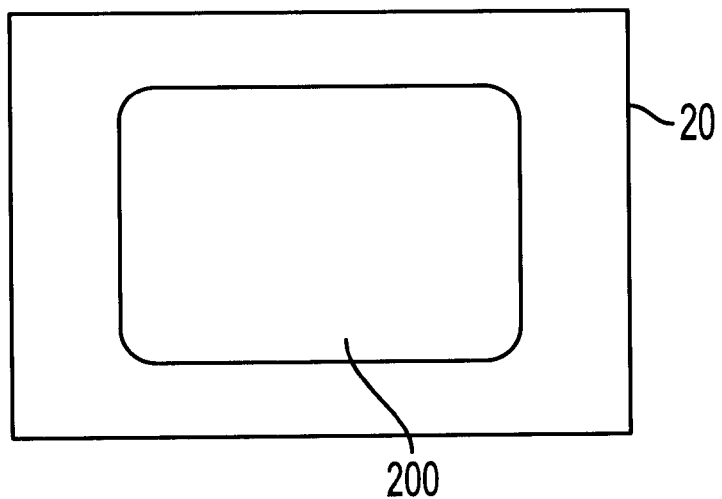
FIG. 2 is a diagram of the monitor according the invention displaying a television signal.
Figure 3:
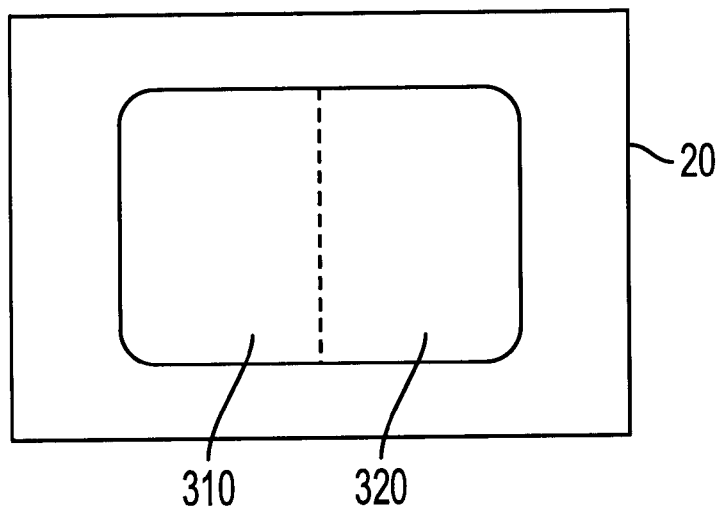
FIG. 3 is a diagram of the monitor according to the invention displaying a television signal on one portion of the monitor display, and displaying a data signal on another portion of the monitor display.
Figure 4:
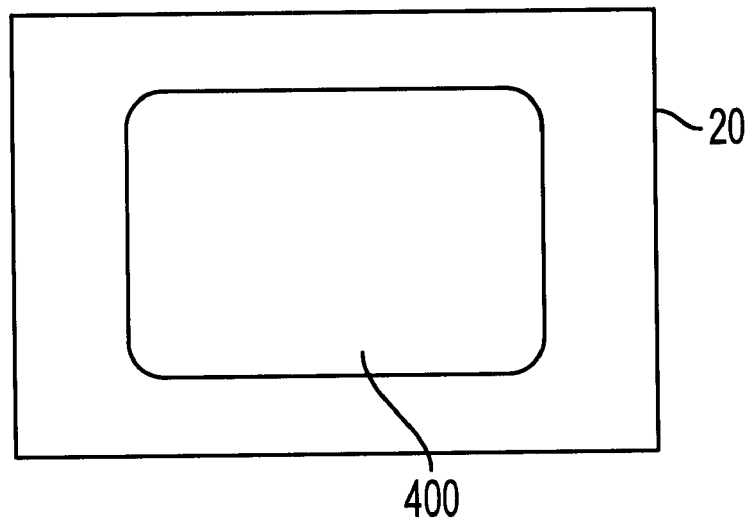
FIG. 4 is a diagram of the monitor according to the invention displaying the data signal on the monitor display.

FIG. 2 shows the monitor 20 displaying a television-only signal in display region 200, FIG. 3 shows the monitor 20 displaying a television signal in display region 310 and displaying a data signal (e.g., Internet data) in display region 320, and FIG. 4 shows the monitor 20 displaying a data signal (e.g., Internet data) in display region 400 (whereby a television signal is not displayed in this mode).

Figure 5:
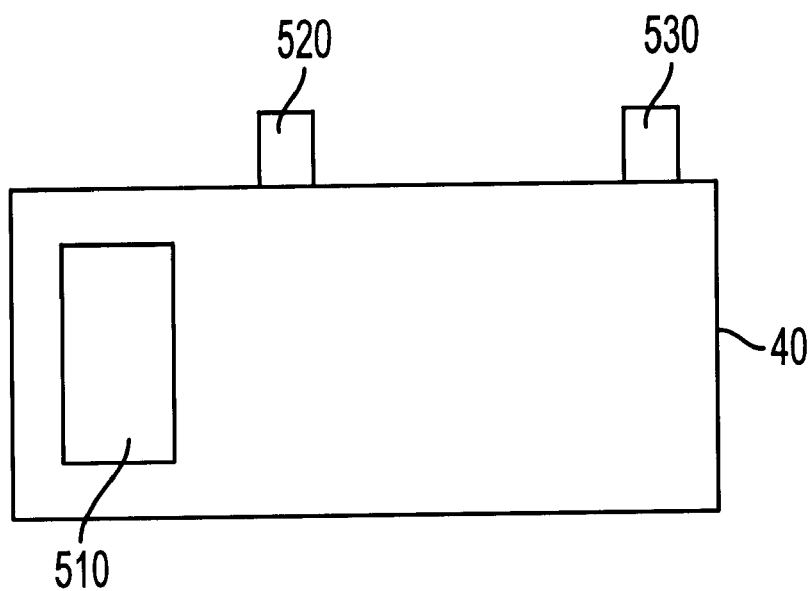
FIG. 5 is a diagram of a remote control input device according to the invention.
Figure 6:
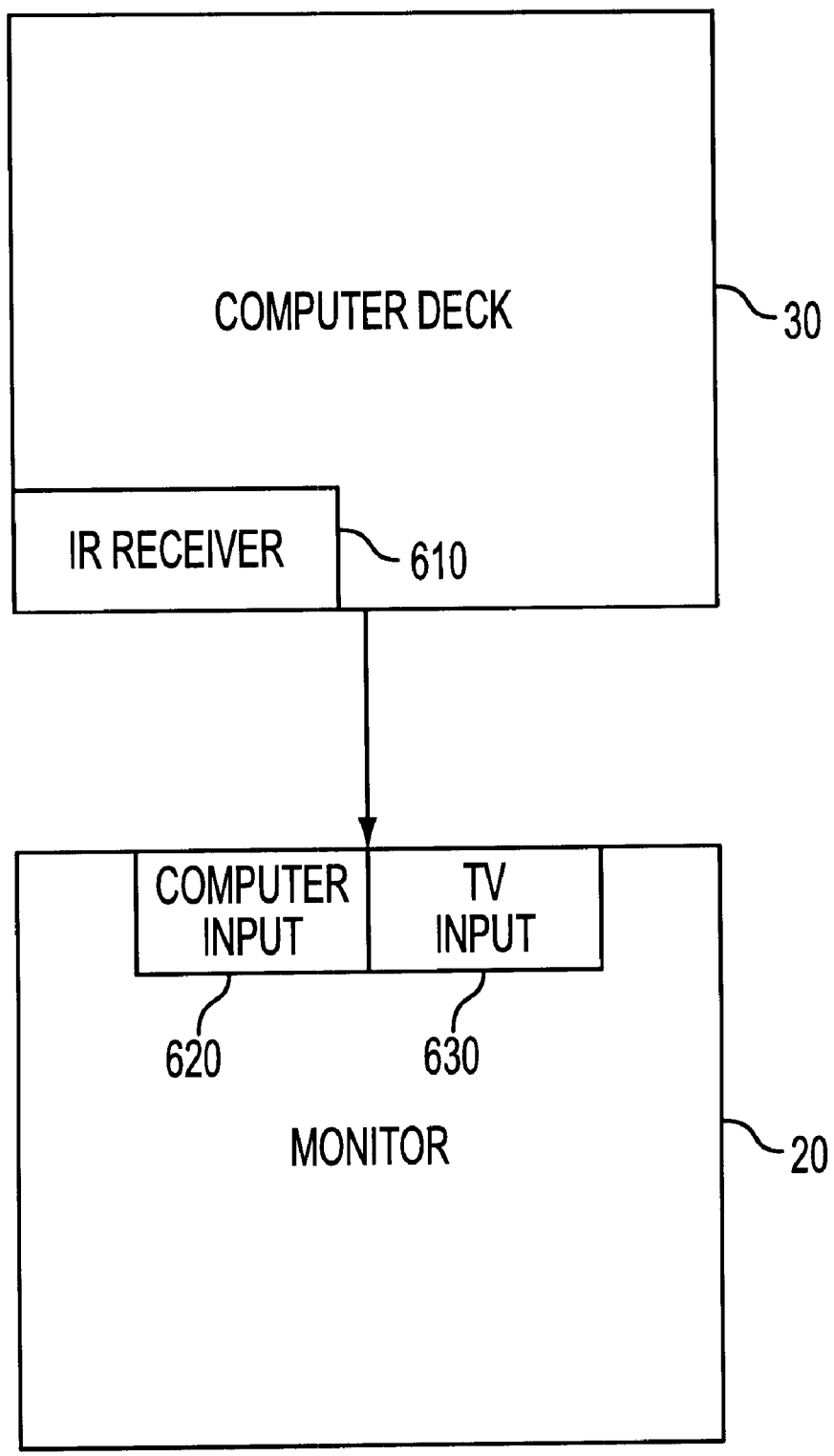
FIG. 6 shows monitor 20, which includes a computer input (VGA 15 pin D-sub) 620 and a cable TV type input (75 Ohm cable) 630.

FIG. 5 shows the remote control input device 40, which includes a pointing device 510 (which is shown as a touchpad, but which may alternatively be a mouse or a trackball), an IR data transmission device 520, an IR receiver device 530.

3. Its black or charcoal gray color.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and equivalents.

What is claimed is:

1. A multimedia computer and television apparatus comprising:

a triple mode monitor portion adapted to display either or both a TV broadcast signal or computer (data) signal, the TV broadcast signal being displayed by itself in a first mode, the computer signal being displayed by itself in a second mode, both the TV broadcast signal and the computer signal being displayed on the monitor portion in a third mode;

a computer portion connected to said monitor portion and configured for both Internet access and television broadcast reception; and a remote control portion adapted to control said computer portion and said monitor portion, wherein said remote control portion is operable to set said monitor portion to one of said first, second and third modes, and wherein said monitor portion operates in said first mode to display said television broadcast signal even when said computer portion is turned off.

2. The multimedia computer and television apparatus as set forth in claim 1, wherein said remote control portion comprises:

a remote control alphanumeric keyboard; and
   a remote control pointing device, wherein, upon operation of said remote control alphanumeric keyboard, a first control signal is sent to said computer portion from said remote control portion, and wherein upon operation of said remote control pointing device, a second control signal is sent to said computer portion from said remote control portion.

3. The multimedia computer and television apparatus as set forth in claim 2, wherein said computer portion includes an IR receiver and wherein said remote control portion includes an IR transmitter, and wherein the first and second control signals are sent over-the-air from said IR transmitter to said IR receiver.

4. The multimedia computer and television apparatus as set forth in claim 3, wherein said remote control pointing device includes at least one of a mouse, a touchpad, and a trackball.

5. The multimedia computer and television apparatus as set forth in claim 1, wherein said monitor portion is configured to receive, on a first input port, a television signal having a television horizontal frequency at a first horizontal scanning frequency, wherein said monitor portion is configured to receive, on a second input port, a computer signal having a computer signal horizontal frequency at a second horizontal scanning frequency different from said first horizontal scanning frequency, and wherein said monitor portion is configured to sense, based on a horizontal scanning frequency of an input signal received from said computer portion on one of said first and second input ports, whether said input signal is said television signal or is said computer signal, and to provide a video output on a display of said monitor portion at a corresponding monitor scanning frequency for said input signal.

6. The multimedia computer and television apparatus as set forth in claim 5, wherein said first input port is a VGA 15-pin input port, and wherein said second input port is a 75-ohm cable input port.

* * * * *